July 15, 1958 — W. T. PFISTER — 2,843,264
AUTOMATIC, VACUO-PNEUMATIC OBJECT SORTING MACHINE
Filed June 17, 1954 — 2 Sheets-Sheet 1
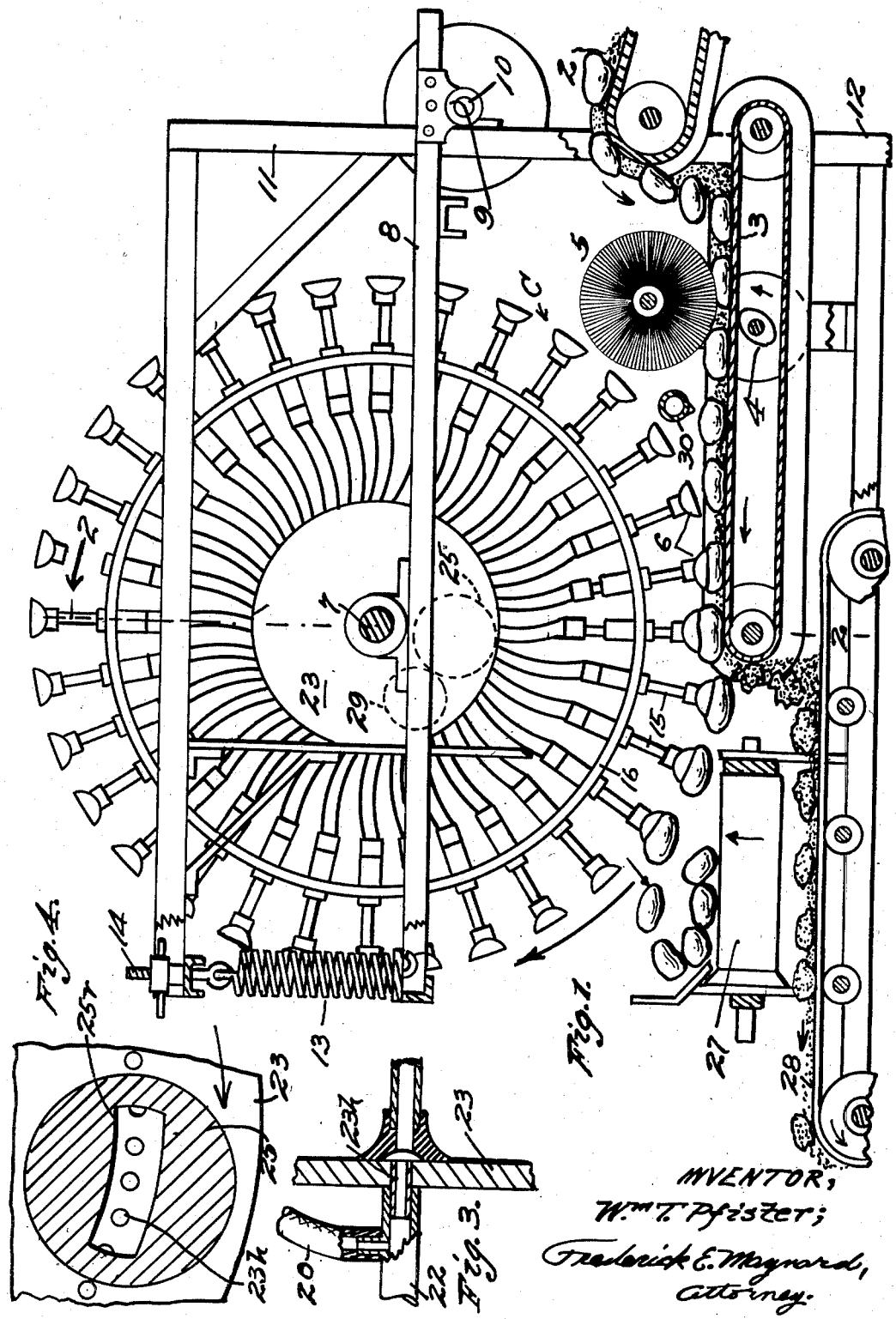

July 15, 1958 W. T. PFISTER 2,843,264
AUTOMATIC, VACUO-PNEUMATIC OBJECT SORTING MACHINE
Filed June 17, 1954 2 Sheets-Sheet 2
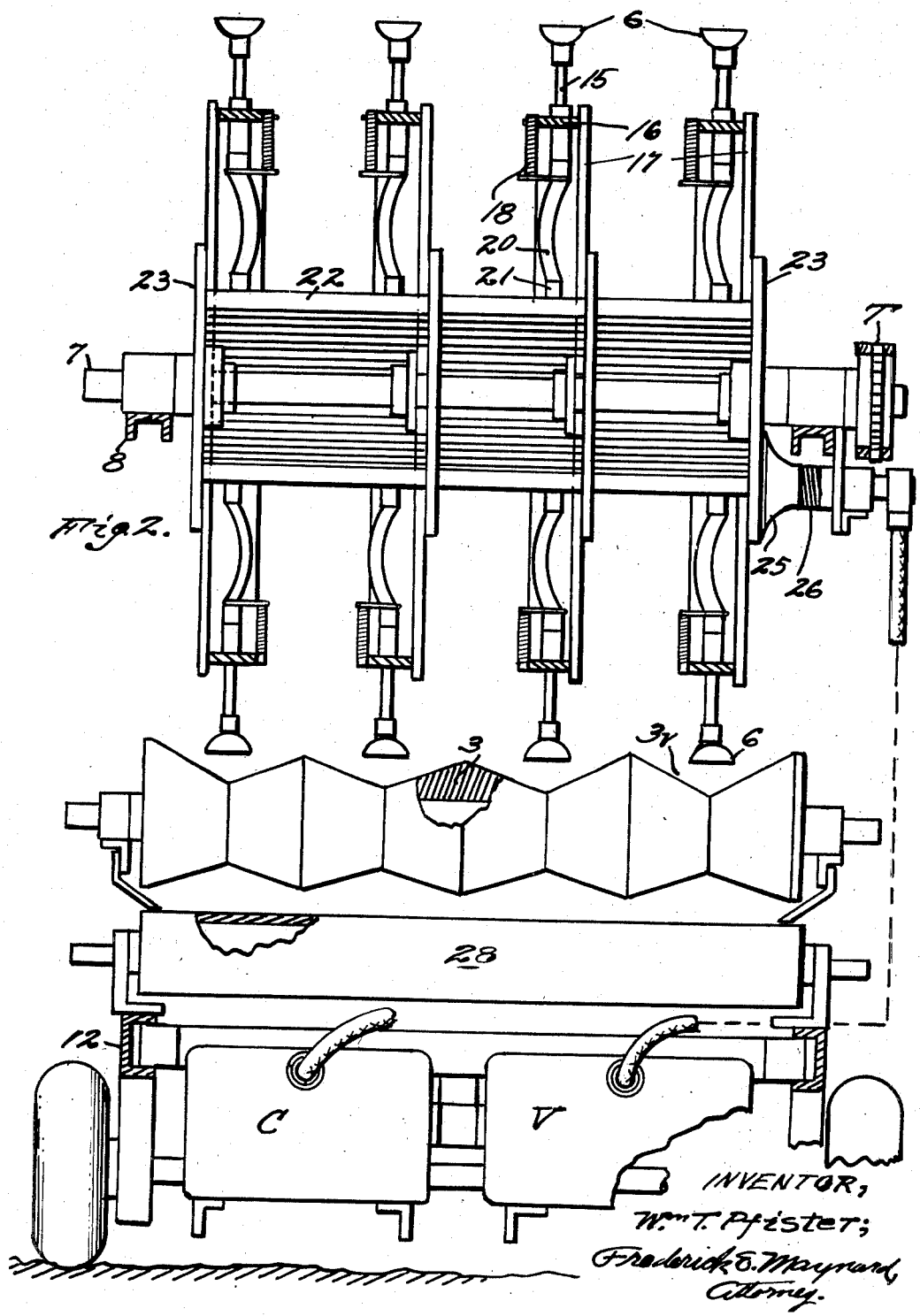

United States Patent Office 2,843,264
Patented July 15, 1958

2,843,264

AUTOMATIC, VACUO-PNEUMATIC OBJECT SORTING MACHINE

William T. Pfister, Los Angeles, Calif.

Application June 17, 1954, Serial No. 437,417

8 Claims. (Cl. 209—108)

This invention directly concerns the art of small body pick-up and transfer and consists of improvements in apparatus combining mechanisms for continuously advancing given bodies, in or without a gangue, to a sorting station, and mechanism continuously operative to pick out the given bodies and shifting the same to and unloading them onto a carry-off means.

Particularly, an intent of this invention is to provide a continuous action machine in which the principle of rotative, effective elements is employed to secure the well known advantages of rotative elements in contrast to mechanisms essentially reciprocative during functions.

Further, it is in the ken of this invention to provide a machine for sorting potatoes, for instance, from an aggregate-advancing, continuous-action belt means and which machine includes a continuously rotative carrier having a plurality of peripheral, straight rows of suction cups which aline with pre-arranged, straight rows of potatoes in lane forming means on the belt.

Also, the invention has for a purpose to provide a unique vacuum controller, forming a running part of the carrier, co-operative with a stationary vacuum cell combining to perform the function of picking up presented potatoes, at the belt station, and automatically shifting them for a short distance of arc to and unloading them at a carry-off belt; the controller and the cell acting to create and break vacuum tension in the stated cups for only a short cup arc travel at the pick-up station—all of the other cups of the respective row being functionally idle, that is, free of vacuum. This is for the purpose of conservating power in the vacuum plant.

Additionally, the invention provides means to air-blast the several suction cups clean during operation of the machine—using the same controller.

The invention resides in certain advancements in this art as set forth in the ensuing disclosure and has, with the above, additional objects and advantages as hereinafter developed, and whose constructions, combinations and sub-combinations and details of means will be made manifest in the following description of the herewith illustrative embodiment and its operation; it being understood that modifications, variations, adaptations and equivalents may be resorted to within the scope, spirit and principles of the invention as it is claimed in conclusion hereof.

Figure 1 is a side elevation, some parts being in vertical section, of the apparatus sorting potatoes as an example. Figure 2 is a vertical, transverse section, looking in direction of the arrow, on line 2—2, Fig. 1. Figure 3 is a diagrammatic elevation of the vacuum controller cheek and its associated vacuum cell. Figure 4 is a detail section of a vacuum manifold connection to the controller cheek, and the vacuum cell device.

The word "bodies" as hereinafter used refers to the given articles or objects which are to be sorted and picked from a supply, whether an aggregate or not.

In the case of operation of the machine on potatoes they are brought into the apparatus by a continuously running digger or other belt 2 and dumped onto a feeder belt 3 having a suitable number of parallel, V-valley lanes 3v, as shown in my copending application Ser. No. 393,996, filed November 24, 1953 for Automatic, Pneumatic (Pressure-Vacuo), Object Sorting Machine, now Patent No. 2,812,061, issued November 5, 1957, the purpose of the lanes being to rapidly jostle elongated potatoes into alinement along the lanes. This is facilitated by a tumbler 4, Fig. 1, beating upward on the load-bearing stretch of the belt 3, and also by a soft presser roller 5 bearing down on the alined potatoes. Dirt, gravel and soil lumps will lodge in the crotch of the valleys between the potatoes.

In the aforesaid application the potatoes are brought in rows, into alinement with bodily, vertically reciprocated straight rows of suction cups. A cardinal principle of the instant invention is to eliminate reciprocating mechanism of that type and, instead, to provide a continuously rotating straight-row means of suction cups so that both the feeding and the pick-up means—mechanisms—are advantageously rotative in operation of the apparatus.

Therefore a suitable number of parallel, peripheral rows of coplanar suction cups 6 is here disclosed, each row being coplanar with co-ordinate valleys of the feed belt. This is effected by employment of a rotary carrier having a central drive shaft 7 rotatively mounted on a frame 8, one end of which is pivoted at 9 on a cross-shaft 10. The shaft 10 is mounted on a main frame 11 forming a part of a wheeled chassis 12 which may be hitched to a travelling potato digger.

The outer end of the frame 8 is suspended by a spring 13 having a nut-and-screw link 14 the purpose of which is to enable vertical adjustment of the carrier cups 6 toward or from the potato lanes of the feeder belt 3, and, further, to allow the carrier to be bodily repressed—elevated—if and when large rock or dirt lumps are brought under the lowermost cups during rotation of the carrier. This is for protection of the cups against oversize debris.

Each cup has an elongate tubular stem 15 and a full row of a suitable number of the stems is mounted, each stem independently yieldable, in a ring 16, or other suitable element, of which a suitable number is rigidly fixed as by spokes 17 in parallel, spaced relation to and along the drive shaft 7, Fig. 2. The several stems are under tension of respective springs 18 pulling the stems to a normal and radially outermost position as to the rings.

Transmission mechanism T operates to drive the cups at approximately the same linear speed as that of the tops of the potatoes on the feed belt so that the flexible mouths of the cups engage easily and smoothly to effect good closure of the cups on the potatoes for vacuum pick-up function.

The stems 15 are here connected by pieces of hose 20 whose inner ends are attached at 21 to elongate tubes 22 parallel to the drive shaft 7 and attached at their opposite ends to flat cheeks 23 affixed suitably to the spokes of the several rings 16. Either or both of the endmost cheeks 23 has a concentric series of port holes 23h opening into the contiguous end of the respective tube 22 so this becomes a manifold for the hose leading outward to the respective, radial stems of co-ordinate cups 6 of a transverse row of the cups. There is a port hole 23h for each of the cup stems in a peripheral row in the carrier ring 16 and each serves its own manifold 22, which, in turn, here serves a row of four stems, Fig. 2; but is not so limited.

It is a distinctive feature of this invention that all of the cheek port holes 23h are normally open to atmosphere—no vacuum in the manifolds—during a nearly full rotation of the carrier and its numerous vacuum cups. An important provision of this invention resides in a constant vacuum system V which includes a device forming a vacuum cell, here in the form of a feather-edged saucer 25, Figs. 2, 3 and 4 pressed by a light-effort spring 26 against the adjacent circular zone of the rotating cheek having the port holes: the spring compensates for mechanical vibrations and for possible unevenness of the face of the cheek. The saucer has in its inner face a recess 25r of a width to concurrently cover a suitable number of the port holes, Fig. 4 and to therefore concurrently draw a vacuum in all of the manifolds opening to the said recess, and in consequence to pull a vacuum in the lowermost of the suction cups, Fig. 1. The rotation of the carrier cheek progressively brings each of the port holes into vacuum cell registering position. The disposition of the cups is such that a cup will positively move down onto the top of an alined potato prior to passing under dead center of the shaft 7 and then pass under said center and be repressed by the engaged potato to ensure a good vacuum seal for safe pick-up of the potato.

The feeder belt 3 ends at a point substantially below the shaft 7 so that any cup in effective engagement with a potato will reliably carry said potato across a gap arc of suitable length. The vacuum will then be broken as the related port hole moves, Fig. 4, from the lip of the saucer to a position over a transport belt 27 transverse to the feeder belt. The released potatoes fall by gravity and are thrown by centrifugal force, from the rapidly rotating carrier cups. Waste or gangue material spills onto a dirt belt 28 leading from the feeder belt.

There is also included in the apparatus a compressed air system C having a compressed air cell 29 which serves compressed air to a suitable number of the port holes in the controller cheek for the purpose of blasting out dust which might find its way into the vacuum stem and hose. Compressed air is also served to a nozzle pipe 30 to dust off potatoes.

What is claimed is:

1. Continuous action apparatus for sorting given-bodies from aggregate; including a rotary carrier having a plurality of peripheral rows of radial suction cups, manifolds connected to transverse rows of the cups along the carrier, a controller device fixed on the carrier and connected to the manifolds, and a vacuum system including a cell bearing snugly on said device to create a vacuum in the manifolds as they come into register with the said cell.

2. The apparatus of claim 1; said cell being located beneath the center of rotation of the carrier whereby to bring manifolds passing below the center into vacuum effect on their cups.

3. The apparatus of claim 1; said device including a flat cheek with port holes opening from the manifolds and which move into communication with the cell.

4. The apparatus of claim 3; and said cell being of saucer form with a vacuum recess open toward said holes.

5. In a sorting apparatus of the class set forth; a rotary carrier, a ring of suction cups around the carrier, a controller cheek fixed to the carrier and having a circle of port holes leading to said cups, and a vacuum cell sealing on the cheek for a portion of said circle whereby to create a vacuum in the cups whose port holes are in register with said cell; the remaining cup port holes being open to atmosphere.

6. A potato sorting machine having, in combination: a rotary carrier; a plurality of vacuum cups arranged on and around the carrier so as to be run below its center of rotation; means to set up a vacuum in those cups passing in an arc under said center and only during such movement; and means for continuously addressing potatoes to those cups passing in said arc whereby to adhere the potatoes to the cups without opposing the force of gravity by making engagement without elevation of the potatoes from said addressing means, said cups being bodily repressible by the potatoes engaged thereby.

7. The invention defined by claim 6 wherein said cups move back to their normal position after moving the potatoes from the addressing means.

8. A potato sorting machine having, in combination: a running carrier having projecting therefrom a plurality of flexible-lipped cups for conformable engagement with presented potatoes, in field aggregate, affixable to the cups by atmospheric pressure for transfer by carrier action; and means for continuously addressing the potatoes and aggregate to said cups as the cups progressively pass above the bed of aggregate to effect a sealing engagement of the potatoes by atmospheric pressure onto contiguous cups moving in their orbit, said cups being bodily repressible from projected position to facilitate sealing contact on the engaged potatoes References Cited in the file of this patent

UNITED STATES PATENTS

| | | |
|---|---|---|
| 1,887,211 | Mortimer | Nov. 8, 1932 |
| 2,020,511 | McHenry | Nov. 12, 1935 |
| 2,023,660 | Bartlett | Dec. 10, 1935 |
| 2,132,447 | Stout | Oct. 11, 1938 |
| 2,171,193 | Ruau | Aug. 29, 1939 |
| 2,606,658 | Powell | Aug. 12, 1952 |
| 2,664,197 | Pfister | Dec. 29, 1953 |